US008318883B1

(12) United States Patent
Yang et al.

(10) Patent No.: US 8,318,883 B1
(45) Date of Patent: Nov. 27, 2012

(54) POLYMER COMPOSITIONS FOR BLOW MOLDING APPLICATIONS

(75) Inventors: Qing Yang, Bartlesville, OK (US); Max P. McDaniel, Bartlesville, OK (US); William B. Beaulieu, Tulsa, OK (US); Youlu Yu, Bartlesville, OK (US); Tony R. Crain, Niolaze, KS (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 13/156,102

(22) Filed: Jun. 8, 2011

(51) Int. Cl.
*C08F 210/16* (2006.01)
*C08F 210/02* (2006.01)

(52) U.S. Cl. .............. 526/348.3; 526/113; 526/114; 526/348.2; 526/348.4; 526/348.5; 502/113; 502/152

(58) Field of Classification Search .............. 526/113, 526/114, 348.2, 348.4, 348.5; 502/113, 152
See application file for complete search history.

(56) References Cited

U.S. PATENT DOCUMENTS

| | | |
|---|---|---|
| 3,248,179 A | 4/1966 | Norwood |
| 3,660,530 A | 5/1972 | Hoblit et al. |
| 3,703,565 A | 11/1972 | Hoblit et al. |
| 4,060,480 A | 11/1977 | Reed et al. |
| 4,452,910 A | 6/1984 | Hopkins et al. |
| 4,501,885 A | 2/1985 | Sherk et al. |
| 4,588,790 A | 5/1986 | Jenkins, III et al. |
| 5,306,775 A | 4/1994 | Martin et al. |
| 5,319,029 A | 6/1994 | Martin et al. |
| 5,352,749 A | 10/1994 | DeChellis et al. |
| 5,376,611 A | 12/1994 | Shveima |
| 5,436,304 A | 7/1995 | Griffin et al. |
| 5,455,314 A | 10/1995 | Burns et al. |
| 5,565,175 A | 10/1996 | Hottovy et al. |
| 5,575,979 A | 11/1996 | Hanson |
| 6,107,230 A | 8/2000 | McDaniel et al. |
| 6,165,929 A | 12/2000 | McDaniel et al. |
| 6,239,235 B1 | 5/2001 | Hottovy et al. |
| 6,262,191 B1 | 7/2001 | Hottovy et al. |
| 6,294,494 B1 | 9/2001 | McDaniel et al. |
| 6,300,271 B1 | 10/2001 | McDaniel et al. |
| 6,316,553 B1 | 11/2001 | McDaniel et al. |
| 6,355,594 B1 | 3/2002 | McDaniel et al. |
| 6,376,415 B1 | 4/2002 | McDaniel et al. |
| 6,388,017 B1 | 5/2002 | McDaniel et al. |
| 6,391,816 B1 | 5/2002 | McDaniel et al. |
| 6,395,666 B1 | 5/2002 | McDaniel et al. |
| 6,524,987 B1 | 2/2003 | Collins et al. |
| 6,548,441 B1 | 4/2003 | McDaniel et al. |
| 6,548,442 B1 | 4/2003 | McDaniel et al. |
| 6,576,583 B1 | 6/2003 | McDaniel et al. |
| 6,613,712 B1 | 9/2003 | McDaniel et al. |
| 6,632,894 B1 | 10/2003 | McDaniel et al. |
| 6,667,274 B1 | 12/2003 | Hawley et al. |
| 6,750,302 B1 | 6/2004 | McDaniel et al. |
| 6,833,415 B2 | 12/2004 | Kendrick et al. |
| 6,982,304 B2 | 1/2006 | Mure et al. |
| 7,312,283 B2 | 12/2007 | Martin et al. |
| 7,517,929 B2 | 4/2009 | Kilgour et al. |
| 7,589,162 B2 * | 9/2009 | Krishnaswamy et al. . 526/348.2 |
| 7,619,047 B2 * | 11/2009 | Yang et al. ............. 526/116 |
| 7,652,160 B2 | 1/2010 | Yang et al. |
| 7,858,702 B2 | 12/2010 | Jaker |
| 7,884,163 B2 | 2/2011 | McDaniel et al. |
| 7,906,603 B2 | 3/2011 | McDaniel et al. |
| 7,910,763 B2 | 3/2011 | Jayaratne et al. |
| 7,915,357 B2 | 3/2011 | Cann et al. |
| 8,202,940 B2 | 6/2012 | Jaker et al. |
| 2007/0043176 A1 * | 2/2007 | Martin et al. ............ 526/64 |
| 2009/0143546 A1 | 6/2009 | Fouarge et al. |
| 2010/0227098 A1 | 9/2010 | Fukushi et al. |

FOREIGN PATENT DOCUMENTS

| | | |
|---|---|---|
| EP | 1845110 A1 | 10/2007 |
| WO | 2005108439 A2 | 11/2005 |

OTHER PUBLICATIONS

Bird, R. Byron, et al., "Fluid mechanics: dynamics of polymeric liquids," 1987, vol. 1, 2nd Edition, cover page, publishing page, and pp. xiii-xviii, 171 and 172, John Wiley & Sons, Inc.

Cotton, F. Albert, et al., "Advanced inorganiccChemistry," 6th Edition, 1999, cover page, title page, and pp. ix-x, John Wiley & Sons, Inc.

Hawley's Condensed Chemical Dictionary, 11th Edition, 1987, cover page, publishing information, contents page, and pp. 862-863, Van Nostrand Reinhold Company.

Hieber, C. A., et al., "Shear-rate-dependence modeling of polymer melt viscosity," Polymer Engineering and Science, Jul. 1992, vol. 32, No. 14, pp. 931-938.

Hieber, C. A., et al., "Some correlations involving the shear viscosity of polystyrene melts," Rheologica Acta, 1989, vol. 28, pp. 321-332.

Pinnavaia, Thomas J., "Intercalated clay catalysts," Science, Apr. 22, 1983, vol. 220, No. 4595, pp. 365-371, American Association for the Advancement of Science.

Thomas, J. M., "Sheet silicate intercalates: new agents for unusual chemical conversions," Intercalation Chemistry, 1982, chapter 3, pp. 55-99, Academic Press, Inc.

Foreign communication from a related counterpart application—International Search Report, PCT/US2012/041466, dated Sep. 11, 2012, 6 pages.

* cited by examiner

*Primary Examiner* — Ling Choi
*Assistant Examiner* — Chun-Cheng Wang
(74) *Attorney, Agent, or Firm* — Conley Rose, P.C.; Rodney B. Carroll; Cheryl L. Huseman

(57) ABSTRACT

A polymer having a density of from about 0.960 g/cc to about 0.965 g/cc and a melt index of from about 0.2 g/10 min. to about 0.6 g/10 min. wherein an article formed from the polymer has an environmental stress crack resistance of equal to or greater than about 150 hours when measured in accordance with ASTM D 1693 condition B, 100% Igepal. A polymer having a density of from about 0.955 g/cc to about 0.960 g/cc and a melt index of from about 0.2 g/10 min. to about 0.6 g/10 min. wherein an article formed from the polymer has an environmental stress crack resistance of equal to or greater than about 500 hours when measured in accordance with ASTM D 1693 condition B, 100% Igepal.

24 Claims, 8 Drawing Sheets

MTE-1  MTE-2

POLYMER COMPOSITIONS FOR BLOW MOLDING APPLICATIONS

FIELD OF THE INVENTION

The present disclosure relates to polymeric compositions, more specifically polyethylene compositions, and articles made from same.

BACKGROUND OF THE INVENTION

Polymeric compositions, such as polyethylene compositions, are used for the production of a wide variety of articles. Often, these articles are exposed to numerous stresses during their lifetime, and that exposure may result in cracks or breaks that adversely affect the utility of the article. The ability of the polymeric composition to resist cracks or breaks is inversely proportional to the density of the polymeric composition creating a challenge for the user in balancing durability (e.g., resistance to cracks and breaks) and polymer density for a particular application. Thus, there is an ongoing need to develop polymers that at higher densities display a high level of resistance to the development of cracks or breaks.

SUMMARY OF THE INVENTION

Disclosed herein is a polymer having a density of from about 0.960 g/cc to about 0.965 g/cc and a melt index of from about 0.2 g/10 min. to about 0.6 g/10 min. wherein an article formed from the polymer has an environmental stress crack resistance of equal to or greater than about 150 hours when measured in accordance with ASTM D 1693 condition B, 100% Igepal.

Also disclosed herein is a polymer having a density of from about 0.955 g/cc to about 0.960 g/cc and a melt index of from about 0.2 g/10 min. to about 0.6 g/10 min. wherein an article formed from the polymer has an environmental stress crack resistance of equal to or greater than about 500 hours when measured in accordance with ASTM D 1693 condition B, 100% Igepal.

Also disclosed herein is a polymer having a density of from about 0.950 g/cc to about 0.955 g/cc and a melt index of from about 0.2 g/10 min. to about 0.6 g/10 min. wherein an article formed from the polymer has an environmental stress crack resistance of equal to or greater than about 2000 hours when measured in accordance with ASTM D 1693 condition B, 100% Igepal.

Also disclosed herein is a polymer having a density of from about 0.950 g/cc to about 0.965 g/cc and a melt index of from about 0.2 g/10 min. to about 0.6 g/10 min. wherein an article formed from the polymer has an environmental stress crack resistance (Y) wherein $Y \geq -75,078,088,945x^4 + 287,612,937,602x^3 - 413,152,026,579x^2 + 263,756,655,421x - 63,139,684,577$ and wherein x is the density of the polymer.

Also disclosed herein is a polymer having at least one lower molecular weight component and at least one higher molecular weight component and comprising a copolymer of ethylene and a comonomer comprising 1-hexene, 1-heptene, 1-octene, 1-nonene, 1-decene, or combinations thereof; wherein the polymer comprises equal to or less than about 0.5 mol. % comonomer; a lower molecular weight component present in an amount of greater than about 60 wt. % and less than about 100 wt. %; a weight average molecular weight ($M_w$) of the lower molecular weight component ranging from about 50 kg/mol to about 120 kg/mol and a $M_w$ of the higher molecular weight component ranging from about 800 kg/mol to about 2000 kg/mol; a polydispersity index of the higher molecular weight component from about 2 to about 4; and a ratio of short chain branching at a molecular weight (MW) of $1 \times 10^6$ to SCB at the peak MW of the polymer of greater than about 3; and wherein the average short chain branching content of each 10 wt. % fraction of polymer increases with molecular weight (MW) increase in a range of MW of greater than about 100 kg/mol.

DETAILED DESCRIPTION

Figure 1:
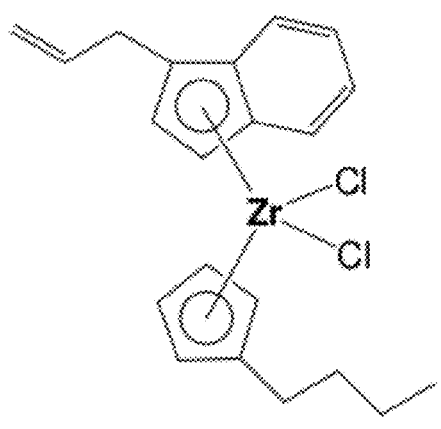
FIG. 1 is a representation of catalyst structures designated MTE-1 and MTE-2.
Figure 1:
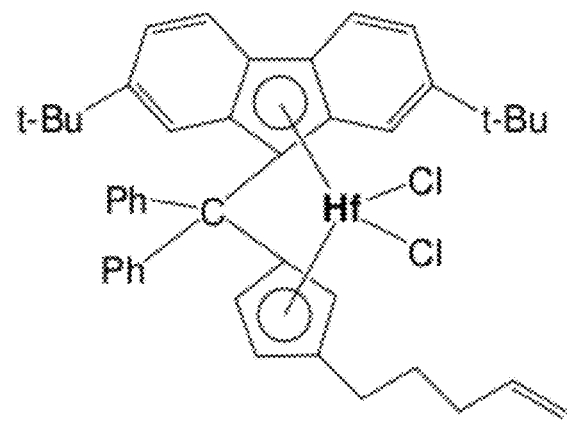

Disclosed herein are polymers, polymeric compositions, polymeric articles, and methods of making same. The polymers and/or polymeric compositions of the present disclosure may comprise polyethylene or a copolymer of ethylene. The polymers and/or polymeric compositions disclosed herein may comprise a blend of polymer components and result in a polymer and/or polymeric composition that unexpectedly displays an increased environmental stress crack resistance (ESCR) when compared to an otherwise similar polymer and/or polymeric composition at the same density. Hereinafter, the polymer refers both to the material collected as the product of a polymerization reaction and the polymeric composition comprising the polymer and one or more additives.

In an embodiment, a polymer of the present disclosure is produced by any olefin polymerization method, using various types of polymerization reactors. As used herein, "polymerization reactor" includes any reactor capable of polymerizing olefin monomers to produce homopolymers and/or copolymers. Homopolymers and/or copolymers produced in the reactor may be referred to as resin and/or polymers. The various types of reactors include, but are not limited to those that may be referred to as batch, slurry, gas-phase, solution, high pressure, tubular, autoclave, or other reactor and/or reactors. Gas phase reactors may comprise fluidized bed reactors or staged horizontal reactors. Slurry reactors may comprise vertical and/or horizontal loops. High pressure reactors may comprise autoclave and/or tubular reactors. Reactor types may include batch and/or continuous processes. Continuous processes may use intermittent and/or continuous product discharge or transfer. Processes may also include partial or full direct recycle of un-reacted monomer, un-reacted comonomer, catalyst and/or co-catalysts, diluents, and/or other materials of the polymerization process.

Polymerization reactor systems of the present disclosure may comprise one type of reactor in a system or multiple reactors of the same or different type, operated in any suitable configuration. Production of polymers in multiple reactors may include several stages in at least two separate polymerization reactors interconnected by a transfer system making it possible to transfer the polymers resulting from the first polymerization reactor into the second reactor. Alternatively, polymerization in multiple reactors may include the transfer, either manual or automatic, of polymer from one reactor to subsequent reactor or reactors for additional polymerization. Alternatively, multi-stage or multi-step polymerization may take place in a single reactor, wherein the conditions are changed such that a different polymerization reaction takes place.

The desired polymerization conditions in one of the reactors may be the same as or different from the operating conditions of any other reactors involved in the overall process of producing the polymer of the present disclosure. Multiple reactor systems may include any combination including, but not limited to multiple loop reactors, multiple gas phase reactors, a combination of loop and gas phase reactors, multiple high pressure reactors or a combination of high pressure with loop and/or gas reactors. The multiple reactors may be operated in series or in parallel. In an embodiment, any arrangement and/or any combination of reactors may be employed to produce the polymer of the present disclosure.

According to one embodiment, the polymerization reactor system may comprise at least one loop slurry reactor. Such reactors are commonplace, and may comprise vertical or horizontal loops. Monomer, diluent, catalyst system, and optionally any comonomer may be continuously fed to a loop slurry reactor, where polymerization occurs. Generally, continuous processes may comprise the continuous introduction of a monomer, a catalyst, and/or a diluent into a polymerization reactor and the continuous removal from this reactor of a suspension comprising polymer particles and the diluent. Reactor effluent may be flashed to remove the liquids that comprise the diluent from the solid polymer, monomer and/or comonomer. Various technologies may be used for this separation step including but not limited to, flashing that may include any combination of heat addition and pressure reduction; separation by cyclonic action in either a cyclone or hydrocyclone; separation by centrifugation; or other appropriate method of separation.

Typical slurry polymerization processes (also known as particle-form processes) are disclosed in U.S. Pat. Nos. 3,248,179, 4,501,885, 5,565,175, 5,575,979, 6,239,235, 6,262,191 and 6,833,415, for example; each of which are herein incorporated by reference in their entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another embodiment, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 4,588,790, 5,352,749, and 5,436,304, each of which is incorporated by reference in its entirety herein.

According to still another embodiment, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another embodiment, the polymerization reactor may comprise a solution polymerization reactor wherein the monomer is contacted with the catalyst composition by suitable stirring or other means. A carrier comprising an organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide polymer properties include, but are not limited to temperature, pressure, type and quantity of catalyst or co-catalyst, and the concentrations of various reactants. Polymerization temperature can affect catalyst productivity, polymer molecular weight and molecular weight distribution. Suitable polymerization temperatures may be any temperature below the de-polymerization temperature, according to the Gibbs Free Energy Equation. Typically, this includes from about 60° C. to about 280° C., for example, and/or from about 70° C. to about 110° C., depending upon the type of polymerization reactor and/or polymerization process.

Suitable pressures will also vary according to the reactor and polymerization process. The pressure for liquid phase polymerization in a loop reactor is typically less than 1000 psig. Pressure for gas phase polymerization is usually at about 200-500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce polymers with certain physical and mechanical properties. The proposed end-use product that will be formed by the polymer and the method of forming that product may be varied to determine the desired final product properties. Mechanical properties include, but are not limited to tensile strength, flexural modulus, impact resistance, creep, stress relaxation and hardness tests. Physical properties include, but are not limited to density, molecular weight, molecular weight distribution, melting temperature, glass transition temperature, temperature melt of crystallization, density, stereoregularity, crack growth, short chain branching, long chain branching and rheological measurements.

The concentrations of monomer, co-monomer, hydrogen, co-catalyst, modifiers, and electron donors are generally important in producing specific polymer properties. Comonomer may be used to control product density. Hydrogen may be used to control product molecular weight. Co-catalysts may be used to alkylate, scavenge poisons and/or control molecular weight. The concentration of poisons may be minimized, as poisons may impact the reactions and/or otherwise affect polymer product properties. Modifiers may be used to control product properties and electron donors may affect stereoregularity.

In an embodiment, a method of preparing a polymer comprises contacting an olefin and/or alpha-olefin monomer with a catalyst system under conditions suitable for the formation of a polymer of the type described herein. Any catalyst system compatible with and able to produce a polymer having the features disclosed herein may be employed. Typical catalyst compositions that can be employed include supported chromium catalysts, Ziegler-Natta catalysts, metallocene catalysts, or combinations thereof.

In an embodiment, a catalyst composition for the production of a polymer of the type disclosed herein may comprise at least two metallocene compounds; an activator support, and an organoaluminum compound. The first metallocene may be used to produce the first component, and may be a tightly bridged metallocene containing a substituent that includes either a terminal olefin or a non-olefin substituent. The second metallocene, which may be used to produce the second component, is generally not bridged and is more responsive to chain termination reagents, such as hydrogen, than the first metallocene. In an embodiment, the first component has a higher molecular weight than the second component. Such metallocene compounds are described in more detail for example in U.S. Pat. Nos. 7,589,162; 7,517,929; 7,619,047; 7,652,160 and 7,910,763, each of which is incorporated herein by reference in its entirety.

In an embodiment, the first metallocene compound has the formula:

$$(X^1R^1)(X^2R^2{}_2)(X^3)(X^3)M^1;$$

wherein $(X^1)$ is cyclopentadienyl, indenyl, or fluorenyl, $(X^2)$ is fluorenyl, and $(X^1)$ and $(X^2)$ are connected by a disubstituted bridging group comprising one atom bonded to both $(X^1)$ and $(X^2)$, wherein the atom is carbon or silicon. A first substituent of the disubstituted bridging group is an aromatic or aliphatic group having from 1 to about 20 carbon atoms. A second substituent of the disubstituted bridging group can be an aromatic or aliphatic group having from 1 to about 20 carbon atoms, or the second substituent of the disubstituted bridging group is an unsaturated aliphatic group having from 3 to about 10 carbon atoms. $R^1$ is H, or an aliphatic group having from 3 to about 10 carbon atoms. $R^2$ is H, an alkyl group having from 1 to about 12 carbon atoms, or an aryl group; $(X^3)$ and $(X^4)$ are each independently 1) a halide; 2) a hydrocarbyl group having up to 20 carbon atoms, H, or $BH_4$; 3) a hydrocarbyloxide group, a hydrocarbylamino group, or a trihydrocarbylsilyl group, any of which having up to 20 carbon atoms; or 4) $OBR^4{}_2$ or $SO_3R^4$, wherein $R^4$ is an alkyl group or an aryl group, any of which having up to 12 carbon atoms; and $M^1$ is Zr or Hf. The first substituent of the disubstituted bridging group may be a phenyl group. The second substituent of the disubstituted bridging group may be a phenyl group, an alkyl group, a butenyl group, a pentenyl group, or a hexenyl group.

In an embodiment, the second metallocene compound has the formula:

$$(X^5)(X^6)(X^7)(X^8)M^2;$$

wherein $(X^5)$ and $(X^6)$ are each independently a cyclopentadienyl, indenyl, substituted cyclopentadienyl or a substituted indenyl, each substituent on $(X^5)$ and $(X^6)$ is independently selected from a linear or branched alkyl group, or a linear or branched alkenyl group, wherein the alkyl group or alkenyl group is unsubstituted or substituted, any substituent on $(X^5)$ and $(X^6)$ having from 1 to about 20 carbon atoms; $(X^7)$ and $(X^8)$ are independently 1) a halide; 2) a hydrocarbyl group having up to 20 carbon atoms, H, or $BH_4$; 3) a hydrocarbyloxide group, a hydrocarbylamino group, or a trihydrocarbylsilyl group, any of which having up to 20 carbon atoms; or 4) $OBR^4{}_2$ or $SO_3R^4$, wherein $R^4$ is an alkyl group or an aryl group, any of which having up to 12 carbon atoms; and $M^2$ is Zr or Hf.

In an embodiment of the present disclosure, the ratio of the first metallocene compound to the second metallocene compound may be from about 1:10 to about 10:1. According to other aspects of the present disclosure, the ratio of the first metallocene compound to the second metallocene compound may be from about 1:5 to about 5:1. According to yet other aspects of the present disclosure, the ratio of the first metallocene compound to the second metallocene compound may be from about 1:2 to about 2:1.

In one aspect, the activator-support comprises a chemically-treated solid oxide. Alternatively, the activator-support can comprise a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, or any combination thereof.

Generally, chemically-treated solid oxides exhibit enhanced acidity as compared to the corresponding untreated solid oxide compound. The chemically-treated solid oxide also functions as a catalyst activator as compared to the corresponding untreated solid oxide. While the chemically-treated solid oxide activates the metallocene(s) in the absence of co-catalysts, it is not necessary to eliminate co-catalysts from the catalyst composition. The activation function of the activator-support is evident in the enhanced activity of catalyst composition as a whole, as compared to a catalyst composition containing the corresponding untreated solid oxide. However, it is believed that the chemically-treated solid oxide can function as an activator, even in the absence of an organoaluminum compound, aluminoxanes, organoboron or organoborate compounds, ionizing ionic compounds, and the like.

The chemically-treated solid oxide can comprise a solid oxide treated with an electron-withdrawing anion. While not intending to be bound by the following statement, it is believed that treatment of the solid oxide with an electron-withdrawing component augments or enhances the acidity of the oxide. Thus, either the activator-support exhibits Lewis or Brønsted acidity that is typically greater than the Lewis or Brønsted acid strength of the untreated solid oxide, or the activator-support has a greater number of acid sites than the untreated solid oxide, or both. One method to quantify the acidity of the chemically-treated and untreated solid oxide materials is by comparing the polymerization activities of the treated and untreated oxides under acid catalyzed reactions.

Chemically-treated solid oxides of this disclosure are formed generally from an inorganic solid oxide that exhibits Lewis acidic or Brønsted acidic behavior and has a relatively high porosity. The solid oxide is chemically-treated with an electron-withdrawing component, typically an electron-withdrawing anion, to form an activator-support.

According to one aspect of the present disclosure, the solid oxide used to prepare the chemically-treated solid oxide has a pore volume greater than about 0.1 cc/g. According to another aspect of the present disclosure, the solid oxide has a pore volume greater than about 0.5 cc/g. According to yet another aspect of the present disclosure, the solid oxide has a pore volume greater than about 1.0 cc/g.

In another aspect, the solid oxide has a surface area of from about 100 $m^2$/g to about 1000 $m^2$/g. In yet another aspect, the solid oxide has a surface area of from about 200 $m^2$/g to about 800 $m^2$/g. In still another aspect of the present disclosure, the solid oxide has a surface area of from about 250 $m^2$/g to about 600 $m^2$/g.

The chemically-treated solid oxide can comprise a solid inorganic oxide comprising oxygen and one or more elements selected from Group 2, 3, 4, 5, 6, 7, 8, 9, 10, 11, 12, 13, 14, or 15 of the periodic table, or comprising oxygen and one or more elements selected from the lanthanide or actinide elements (See: Hawley's Condensed Chemical Dictionary, 11th Ed., John Wiley & Sons, 1995; Cotton, F. A., Wilkinson, G., Murillo, C. A., and Bochmann, M., Advanced Inorganic Chemistry, 6th Ed., Wiley-Interscience, 1999). For example, the inorganic oxide can comprise oxygen and an element, or elements, selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr.

Suitable examples of solid oxide materials or compounds that can be used to form the chemically-treated solid oxide include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof. For example, the solid oxide can comprise silica, alumina, silica-alumina, silica-coated alumina, aluminum phosphate, aluminophosphate, heteropolytungstate, titania, zirconia, magnesia, boria, zinc oxide, mixed oxides thereof, or any combination thereof.

The solid oxide of this disclosure encompasses oxide materials such as alumina, "mixed oxide" compounds thereof such as silica-alumina, and combinations and mixtures thereof. The mixed oxide compounds such as silica-alumina can be single or multiple chemical phases with more than one metal combined with oxygen to form a solid oxide compound. Examples of mixed oxides that can be used in the activator-support of the present disclosure include, but are not limited to, silica-alumina, silica-titania, silica-zirconia, zeolites, various clay minerals, alumina-titania, alumina-zirconia, zinc-aluminate, alumina-boria, silica-boria, aluminophosphate-silica, titania-zirconia, and the like. The solid oxide of this disclosure also encompasses oxide materials such as silica-coated alumina, as described in U.S. Pat. No. 7,884,163, the disclosure of which is incorporated herein by reference in its entirety.

The electron-withdrawing component used to treat the solid oxide can be any component that increases the Lewis or Brønsted acidity of the solid oxide upon treatment (as compared to the solid oxide that is not treated with at least one electron-withdrawing anion). According to one aspect of the present disclosure, the electron-withdrawing component is an electron-withdrawing anion derived from a salt, an acid, or other compound, such as a volatile organic compound, that serves as a source or precursor for that anion. Examples of electron-withdrawing anions include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phosphotungstate, and the like, including mixtures and combinations thereof. In addition, other ionic or non-ionic compounds that serve as sources for these electron-withdrawing anions also can be employed in the present disclosure. It is contemplated that the electron-withdrawing anion can be, or can comprise, fluoride, chloride, bromide, phosphate, triflate, bisulfate, or sulfate, and the like, or any combination thereof, in some aspects of this disclosure. In other aspects, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or any combination thereof.

Thus, for example, the activator-support (e.g., chemically-treated solid oxide) used in the catalyst compositions can be, or can comprise, fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof. In one aspect, the activator-support can be, or can comprise, fluorided alumina, sulfated alumina, fluorided silica-alumina, sulfated silica-alumina, fluorided silica-coated alumina, sulfated silica-coated alumina, phosphated silica-coated alumina, and the like, or any combination thereof. In another aspect, the activator-support comprises fluorided alumina; alternatively, comprises chlorided alumina; alternatively, comprises sulfated alumina; alternatively, comprises fluorided silica-alumina; alternatively, comprises sulfated silica-alumina; alternatively, comprises fluorided silica-zirconia; alternatively, comprises chlorided silica-zirconia; or alternatively, comprises fluorided silica-coated alumina.

When the electron-withdrawing component comprises a salt of an electron-withdrawing anion, the counterion or cation of that salt can be selected from any cation that allows the salt to revert or decompose back to the acid during calcining. Factors that dictate the suitability of the particular salt to serve as a source for the electron-withdrawing anion include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion include, but are not limited to, ammonium, trialkyl ammonium, tetraalkyl ammonium, tetraalkyl phosphonium, $H^+$, $[H(OEt_2)_2]^+$, and the like.

Further, combinations of one or more different electron-withdrawing anions, in varying proportions, can be used to tailor the specific acidity of the activator-support to the desired level. Combinations of electron-withdrawing components can be contacted with the oxide material simultaneously or individually, and in any order that affords the desired chemically-treated solid oxide acidity. For example, one aspect of this disclosure is employing two or more electron-withdrawing anion source compounds in two or more separate contacting steps.

Thus, one example of such a process by which a chemically-treated solid oxide is prepared is as follows: a selected solid oxide, or combination of solid oxides, is contacted with a first electron-withdrawing anion source compound to form a first mixture; this first mixture is calcined and then contacted with a second electron-withdrawing anion source compound to form a second mixture; the second mixture is then calcined to form a treated solid oxide. In such a process, the first and second electron-withdrawing anion source compounds can be either the same or different compounds.

According to another aspect of the present disclosure, the chemically-treated solid oxide comprises a solid inorganic oxide material, a mixed oxide material, or a combination of inorganic oxide materials, that is chemically-treated with an electron-withdrawing component, and optionally treated with a metal source, including metal salts, metal ions, or other metal-containing compounds. Nonlimiting examples of the metal or metal ion include zinc, nickel, vanadium, titanium, silver, copper, gallium, tin, tungsten, molybdenum, zirconium, and the like, or combinations thereof. Examples of chemically-treated solid oxides that contain a metal or metal ion include, but are not limited to, chlorided zinc-impregnated alumina, fluorided titanium-impregnated alumina, fluorided zinc-impregnated alumina, chlorided zinc-impregnated silica-alumina, fluorided zinc-impregnated silica-alumina, sulfated zinc-impregnated alumina, chlorided zinc aluminate, fluorided zinc aluminate, sulfated zinc aluminate, silica-coated alumina treated with hexafluorotitanic acid, silica-coated alumina treated with zinc and then fluorided, and the like, or any combination thereof.

Any method of impregnating the solid oxide material with a metal can be used. The method by which the oxide is contacted with a metal source, typically a salt or metal-containing compound, can include, but is not limited to, gelling, co-gelling, impregnation of one compound onto another, and the like. If desired, the metal-containing compound is added to or impregnated into the solid oxide in solution form, and subsequently converted into the supported metal upon calcining. Accordingly, the solid inorganic oxide can further comprise a metal selected from zinc, titanium, nickel, vanadium, silver, copper, gallium, tin, tungsten, molybdenum, and the like, or combinations of these metals. For example, zinc is often used to impregnate the solid oxide because it can provide improved catalyst activity at a low cost.

The solid oxide can be treated with metal salts or metal-containing compounds before, after, or at the same time that the solid oxide is treated with the electron-withdrawing anion. Following any contacting method, the contacted mixture of solid compound, electron-withdrawing anion, and the metal ion is typically calcined. Alternatively, a solid oxide material, an electron-withdrawing anion source, and the metal salt or metal-containing compound are contacted and calcined simultaneously.

Various processes are used to form the chemically-treated solid oxide useful in the present disclosure. The chemically-treated solid oxide can comprise the contact product of one or more solid oxides with one or more electron-withdrawing anion sources. It is not required that the solid oxide be calcined prior to contacting the electron-withdrawing anion source. The contact product typically is calcined either during or after the solid oxide is contacted with the electron-withdrawing anion source. The solid oxide can be calcined or uncalcined. Various processes to prepare solid oxide activator-supports that can be employed in this disclosure have been reported. For example, such methods are described in U.S. Pat. Nos. 6,107,230; 6,165,929; 6,294,494; 6,300,271; 6,316,553; 6,355,594; 6,376,415; 6,388,017; 6,391,816; 6,395,666; 6,524,987; 6,548,441; 6,548,442; 6,576,583; 6,613,712; 6,632,894; 6,667,274; and 6,750,302, the disclosures of which are incorporated herein by reference in their entirety.

According to one aspect of the present disclosure, the solid oxide material is chemically-treated by contacting it with an electron-withdrawing component, typically an electron-withdrawing anion source. Further, the solid oxide material optionally is chemically treated with a metal ion, and then calcined to form a metal-containing or metal-impregnated chemically-treated solid oxide. According to another aspect of the present disclosure, the solid oxide material and electron-withdrawing anion source are contacted and calcined simultaneously.

The method by which the oxide is contacted with the electron-withdrawing component, typically a salt or an acid of an electron-withdrawing anion, can include, but is not limited to, gelling, co-gelling, impregnation of one compound onto another, and the like. Thus, following any contacting method, the contacted mixture of the solid oxide, electron-withdrawing anion, and optional metal ion, is calcined.

The solid oxide activator-support (i.e., chemically-treated solid oxide) thus can be produced by a process comprising:

(1) contacting a solid oxide (or solid oxides) with an electron-withdrawing anion source compound (or compounds) to form a first mixture; and (2) calcining the first mixture to form the solid oxide activator-support.

According to another aspect of the present disclosure, the solid oxide activator-support (chemically-treated solid oxide) is produced by a process comprising:

(1) contacting a solid oxide (or solid oxides) with a first electron-withdrawing anion source compound to form a first mixture;

(2) calcining the first mixture to produce a calcined first mixture;

(3) contacting the calcined first mixture with a second electron-withdrawing anion source compound to form a second mixture; and (4) calcining the second mixture to form the solid oxide activator-support.

According to yet another aspect of the present disclosure, the chemically-treated solid oxide is produced or formed by contacting the solid oxide with the electron-withdrawing anion source compound, where the solid oxide compound is calcined before, during, or after contacting the electron-withdrawing anion source, and where there is a substantial absence of aluminoxanes, organoboron or organoborate compounds, and ionizing ionic compounds.

Calcining of the treated solid oxide generally is conducted in an ambient atmosphere, typically in a dry ambient atmosphere, at a temperature from about 200° C. to about 900° C., and for a time of about 1 minute to about 100 hours. Calcining can be conducted at a temperature of from about 300° C. to about 800° C., or alternatively, at a temperature of from about 400° C. to about 700° C. Calcining can be conducted for about 30 minutes to about 50 hours, or for about 1 hour to about 15 hours. Thus, for example, calcining can be carried out for about 1 to about 10 hours at a temperature of from about 350° C. to about 550° C. Any suitable ambient atmosphere can be employed during calcining. Generally, calcining is conducted in an oxidizing atmosphere, such as air. Alternatively, an inert atmosphere, such as nitrogen or argon, or a reducing atmosphere, such as hydrogen or carbon monoxide, can be used.

According to one aspect of the present disclosure, the solid oxide material is treated with a source of halide ion, sulfate ion, or a combination of anions, optionally treated with a metal ion, and then calcined to provide the chemically-treated solid oxide in the form of a particulate solid. For example, the solid oxide material can be treated with a source of sulfate (termed a "sulfating agent"), a source of chloride ion (termed a "chloriding agent"), a source of fluoride ion (termed a "fluoriding agent"), or a combination thereof, and calcined to provide the solid oxide activator. Useful acidic activator-supports include, but are not limited to, bromided alumina, chlorided alumina, fluorided alumina, sulfated alumina, bromided silica-alumina, chlorided silica-alumina, fluorided silica-alumina, sulfated silica-alumina, bromided silica-zirconia, chlorided silica-zirconia, fluorided silica-zirconia, sulfated silica-zirconia, fluorided silica-titania, alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, a pillared clay, such as a pillared montmorillonite, optionally treated with fluoride, chloride, or sulfate; phosphated alumina or other aluminophosphates optionally treated with sulfate, fluoride, or chloride; or any combination of the above. Further, any of these activator-supports optionally can be treated with a metal ion.

The chemically-treated solid oxide can comprise a fluorided solid oxide in the form of a particulate solid. The fluorided solid oxide can be formed by contacting a solid oxide with a fluoriding agent. The fluoride ion can be added to the oxide by forming a slurry of the oxide in a suitable solvent such as alcohol or water including, but not limited to, the one to three carbon alcohols because of their volatility and low surface tension. Examples of suitable fluoriding agents include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4PF_6$), hexafluorotitanic acid ($H_2TiF_6$), ammonium hexafluorotitanic acid (($NH_4)_2TiF_6$), hexafluorozirconic acid ($H_2ZrF_6$), $AlF_3$, $NH_4AlF_4$, analogs thereof, and combinations thereof. Triflic acid and ammonium triflate also can be employed. For example, ammonium bifluoride ($NH_4HF_2$) can be used as the fluoriding agent, due to its ease of use and availability.

If desired, the solid oxide is treated with a fluoriding agent during the calcining step. Any fluoriding agent capable of thoroughly contacting the solid oxide during the calcining step can be used. For example, in addition to those fluoriding agents described previously, volatile organic fluoriding agents can be used. Examples of volatile organic fluoriding agents useful in this aspect of the disclosure include, but are not limited to, freons, perfluorohexane, perfluorobenzene, fluoromethane, trifluoroethanol, and the like, and combinations thereof. Calcining temperatures generally must be high enough to decompose the compound and release fluoride. Gaseous hydrogen fluoride (HF) or fluorine ($F_2$) itself also can be used with the solid oxide if fluorided while calcining. Silicon tetrafluoride ($SiF_4$) and compounds containing tetrafluoroborate ($BR_4^-$) also can be employed. One convenient method of contacting the solid oxide with the fluoriding agent is to vaporize a fluoriding agent into a gas stream used to fluidize the solid oxide during calcination.

Similarly, in another aspect of this disclosure, the chemically-treated solid oxide comprises a chlorided solid oxide in the form of a particulate solid. The chlorided solid oxide is formed by contacting a solid oxide with a chloriding agent. The chloride ion can be added to the oxide by forming a slurry of the oxide in a suitable solvent. The solid oxide can be treated with a chloriding agent during the calcining step. Any chloriding agent capable of serving as a source of chloride and thoroughly contacting the oxide during the calcining step can be used, such as $SiCl_4$, $SiMe_2Cl_2$, $TiCl_4$, $BCl_3$, and the like, including mixtures thereof. Volatile organic chloriding agents can be used. Examples of suitable volatile organic chloriding agents include, but are not limited to, certain freons, perchlorobenzene, chloromethane, dichloromethane, chloroform, carbon tetrachloride, trichloroethanol, and the like, or any combination thereof. Gaseous hydrogen chloride or chlorine itself also can be used with the solid oxide during calcining. One convenient method of contacting the oxide with the chloriding agent is to vaporize a chloriding agent into a gas stream used to fluidize the solid oxide during calcination.

The amount of fluoride or chloride ion present before calcining the solid oxide generally is from about 1 to about 50% by weight, where the weight percent is based on the weight of the solid oxide, for example, silica-alumina, before calcining. According to another aspect of this disclosure, the amount of fluoride or chloride ion present before calcining the solid oxide is from about 1 to about 25% by weight, and according to another aspect of this disclosure, from about 2 to about 20% by weight. According to yet another aspect of this disclosure, the amount of fluoride or chloride ion present before calcining the solid oxide is from about 4 to about 10% by weight. Once impregnated with halide, the halided oxide can be dried by any suitable method including, but not limited to, suction filtration followed by evaporation, drying under vacuum, spray drying, and the like, although it is also possible to initiate the calcining step immediately without drying the impregnated solid oxide.

The silica-alumina used to prepare the treated silica-alumina typically has a pore volume greater than about 0.5 cc/g. According to one aspect of the present disclosure, the pore volume is greater than about 0.8 cc/g, and according to another aspect of the present disclosure, greater than about 1.0 cc/g. Further, the silica-alumina generally has a surface area greater than about 100 $m^2/g$. According to another aspect of this disclosure, the surface area is greater than about 250 $m^2/g$. Yet, in another aspect, the surface area is greater than about 350 $m^2/g$.

The silica-alumina utilized in the present disclosure typically has an alumina content from about 5 to about 95% by weight. According to one aspect of this disclosure, the alumina content of the silica-alumina is from about 5 to about 50%, or from about 8% to about 30%, alumina by weight. In another aspect, high alumina content silica-alumina compounds can employed, in which the alumina content of these silica-alumina compounds typically ranges from about 60% to about 90%, or from about 65% to about 80%, alumina by weight. According to yet another aspect of this disclosure, the solid oxide component comprises alumina without silica, and according to another aspect of this disclosure, the solid oxide component comprises silica without alumina.

The sulfated solid oxide comprises sulfate and a solid oxide component, such as alumina or silica-alumina, in the form of a particulate solid. Optionally, the sulfated oxide is treated further with a metal ion such that the calcined sulfated oxide comprises a metal. According to one aspect of the present disclosure, the sulfated solid oxide comprises sulfate and alumina. In some instances, the sulfated alumina is formed by a process wherein the alumina is treated with a sulfate source, for example, sulfuric acid or a sulfate salt such as ammonium sulfate. This process is generally performed by forming a slurry of the alumina in a suitable solvent, such as alcohol or water, in which the desired concentration of the sulfating agent has been added. Suitable organic solvents include, but are not limited to, the one to three carbon alcohols because of their volatility and low surface tension.

According to one aspect of this disclosure, the amount of sulfate ion present before calcining is from about 0.5 to about 100 parts by weight sulfate ion to about 100 parts by weight solid oxide. According to another aspect of this disclosure, the amount of sulfate ion present before calcining is from about 1 to about 50 parts by weight sulfate ion to about 100 parts by weight solid oxide, and according to still another aspect of this disclosure, from about 5 to about 30 parts by weight sulfate ion to about 100 parts by weight solid oxide. These weight ratios are based on the weight of the solid oxide before calcining. Once impregnated with sulfate, the sulfated oxide can be dried by any suitable method including, but not limited to, suction filtration followed by evaporation, drying under vacuum, spray drying, and the like, although it is also possible to initiate the calcining step immediately.

According to another aspect of the present disclosure, the activator-support used in preparing the catalyst compositions of this disclosure comprises an ion-exchangeable activator-support, including but not limited to silicate and aluminosilicate compounds or minerals, either with layered or non-layered structures, and combinations thereof. In another aspect of this disclosure, ion-exchangeable, layered aluminosilicates such as pillared clays are used as activator-supports. When the acidic activator-support comprises an ion-exchangeable activator-support, it can optionally be treated with at least one electron-withdrawing anion such as those disclosed herein, though typically the ion-exchangeable activator-support is not treated with an electron-withdrawing anion.

According to another aspect of the present disclosure, the activator-support of this disclosure comprises clay minerals having exchangeable cations and layers capable of expanding. Typical clay mineral activator-supports include, but are not limited to, ion-exchangeable, layered aluminosilicates such as pillared clays. Although the term "support" is used, it is not meant to be construed as an inert component of the catalyst composition, but rather is to be considered an active part of the catalyst composition, because of its intimate association with the metallocene component.

According to another aspect of the present disclosure, the clay materials of this disclosure encompass materials either in their natural state or that have been treated with various ions by wetting, ion exchange, or pillaring. Typically, the clay material activator-support of this disclosure comprises clays that have been ion exchanged with large cations, including polynuclear, highly charged metal complex cations. However, the clay material activator-supports of this disclosure also encompass clays that have been ion exchanged with simple salts, including, but not limited to, salts of Al(III), Fe(II), Fe(III), and Zn(II) with ligands such as halide, acetate, sulfate, nitrate, or nitrite.

According to another aspect of the present disclosure, the activator-support comprises a pillared clay. The term "pillared clay" is used to refer to clay materials that have been ion exchanged with large, typically polynuclear, highly charged metal complex cations. Examples of such ions include, but are not limited to, Keggin ions which can have charges such as 7+, various polyoxometallates, and other large ions. Thus, the term pillaring refers to a simple exchange reaction in which the exchangeable cations of a clay material are replaced with large, highly charged ions, such as Keggin ions. These polymeric cations are then immobilized within the interlayers of the clay and when calcined are converted to metal oxide "pillars," effectively supporting the clay layers as column-like structures. Thus, once the clay is dried and calcined to produce the supporting pillars between clay layers, the expanded lattice structure is maintained and the porosity is enhanced. The resulting pores can vary in shape and size as a function of the pillaring material and the parent clay material used. Examples of pillaring and pillared clays are found in: T. J. Pinnavaia, Science 220 (4595), 365-371 (1983); J. M. Thomas, Intercalation Chemistry, (S. Whittington and A. Jacobson, eds.) Ch. 3, pp. 55-99, Academic Press, Inc., (1972); U.S. Pat. Nos. 4,452,910; 5,376,611; and 4,060,480; the disclosures of which are incorporated herein by reference in their entirety.

The pillaring process utilizes clay minerals having exchangeable cations and layers capable of expanding. Any pillared clay that can enhance the polymerization of olefins in the catalyst composition of the present disclosure can be used. Therefore, suitable clay minerals for pillaring include, but are not limited to, allophanes; smectites, both dioctahedral (Al) and tri-octahedral (Mg) and derivatives thereof such as montmorillonites (bentonites), nontronites, hectorites, or laponites; halloysites; vermiculites; micas; fluoromicas; chlorites; mixed-layer clays; the fibrous clays including but not limited to sepiolites, attapulgites, and palygorskites; a serpentine clay; illite; laponite; saponite; and any combination thereof. In one aspect, the pillared clay activator-support comprises bentonite or montmorillonite. The principal component of bentonite is montmorillonite.

The pillared clay can be pretreated if desired. For example, a pillared bentonite is pretreated by drying at about 300° C. under an inert atmosphere, typically dry nitrogen, for about 3 hours, before being added to the polymerization reactor. Although an exemplary pretreatment is described herein, it should be understood that the preheating can be carried out at many other temperatures and times, including any combination of temperature and time steps, all of which are encompassed by this disclosure.

The activator-support used to prepare the catalyst compositions of the present disclosure can be combined with other inorganic support materials, including, but not limited to, zeolites, inorganic oxides, phosphated inorganic oxides, and the like. In one aspect, typical support materials that are used include, but are not limited to, silica, silica-alumina, alumina, titania, zirconia, magnesia, boria, thoria, aluminophosphate, aluminum phosphate, silica-titania, coprecipitated silica/titania, mixtures thereof, or any combination thereof.

The process of making these activator-supports may include precipitation, co-precipitation, impregnation, gelation, pore-gelation, calcining (at up to 900° C.), spray-drying, flash-drying, rotary drying and calcining, milling, sieving, and similar operations.

In an embodiment, the organoaluminum compound used with the present disclosure may have the formula:

$(R^3)_3Al$;

in which $(R^3)$ is an aliphatic group having from 2 to about 6 carbon atoms. In some instances, $(R^3)$ is ethyl, propyl, butyl, hexyl, or isobutyl.

In an embodiment, the catalysts are chosen from compounds like those represented by the chemical structures A and B with fluorided alumina as the activator-support and with tri-isobutylaluminum (TIBA) as the co-catalyst.

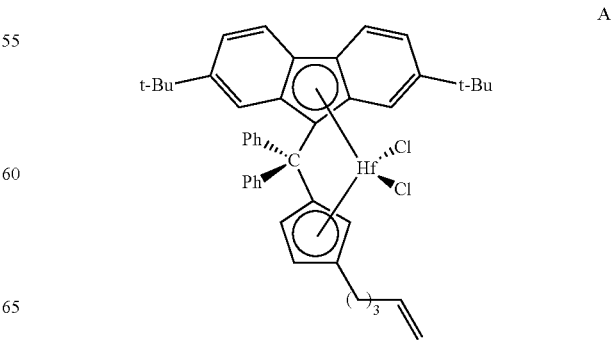

A

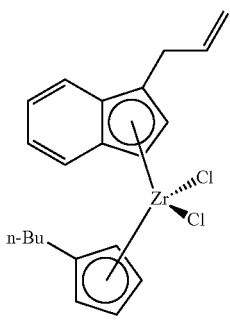

In an embodiment, a monomer (e.g., ethylene) is polymerized using the methodologies disclosed herein to produce a polymer of the type disclosed herein. The polymer may comprise a homopolymer, a copolymer, and/or combinations thereof. In an embodiment, the polymer is a copolymer comprising ethylene and one or more comonomers such as, for example, alpha olefins. Examples of suitable comonomers include, but are not limited to, unsaturated hydrocarbons having from 3 to 20 carbon atoms such as propylene, 1-butene, 1-pentene, 1-hexene, 3-methyl-1-butene, 4-methyl-1-pentene, 1-heptene, 1-octene, 1-nonene, 1-decene, and mixtures thereof. In an embodiment, the comonomer is 1-hexene. In an embodiment, the commoner may be present in the polymer in an amount of equal to or less than about 0.5 mol. %, alternatively less than about 0.4 mol. %, alternatively less than about 0.3 mol. % or alternatively less than about 0.2 mol. %.

The polymer may include other additives. Examples of additives include, but are not limited to, antistatic agents, colorants, stabilizers, nucleators, surface modifiers, pigments, slip agents, antiblocks, tackafiers, polymer processing aids, and combinations thereof. Such additives may be used singularly or in combination and may be included in the polymer before, during, or after preparation of the polymer as described herein. Such additives may be added in any amount suitable to achieve some user and/or process need. As will be understood by one of ordinary skill in the art, additives may be chosen and included in amounts that achieve the user and/or process need while not detrimentally affecting the advantageous properties of the disclosed compositions. Such additives may be added via any suitable technique, for example during an extrusion or compounding step such as during pelletization or subsequent processing into an end use article.

A polymer of the type described herein may be of any modality. Herein, the "modality" of a polymer refers to the form of its molecular weight distribution curve, i.e. the appearance of the graph of the polymer weight fraction as a function of its molecular weight. The polymer weight fraction refers to the weight fraction of molecules of a given size. A polymer having a molecular weight distribution curve showing a single peak may be referred to as a unimodal polymer, a polymer having a curve showing two distinct peaks may be referred to as a bimodal polymer, a polymer having a curve showing three distinct peaks may be referred to as a trimodal polymer, etc. Polymers having molecular weight distribution curves showing more than one peak may be collectively referred to as multimodal polymers.

A polymer of the type described herein may have two or more components that may be distinguishable from one another, for example based upon their individual composition and/or molecular weight distribution. A molecular weight distribution curve may be prepared for each individual component of the polymer. For example, the molecular weight distribution curve for the individual components of the polymer may display a single peak and thus be unimodal. The molecular weight distribution curves for the individual components may be superimposed onto a common chart to form the molecular weight distribution curve for the polymer as a whole. For example, superimposition of the molecular weight distribution curves from the individual components may show a single peak that is broadened in comparison with the curves for the individual components corresponding to polymer fractions having different but overlapping molecular weight distributions. In an alternative embodiment, upon superimposition of the molecular weight distribution curves for the individual components of the polymer, the resultant profile shows n distinct peaks corresponding to n polymer components of differing molecular weight distributions. Such compositions may have the modality correlated to the number of distinct peaks in the molecular weight distribution profile. For example, a bimodal polymer may show two distinct peaks corresponding to two individual components while a trimodal polymer composition may show three distinct peaks corresponding to three individual polymer components.

In an aspect, the polymer comprises a first component and a second component. The first component may be of a higher molecular weight relative to the second component and the components are hereinafter described as a higher molecular weight (HMW) component and a lower molecular weight (LMW) component. In an embodiment, the LMW component is present in the polymer in an amount in the range of greater than about 60 weight percent (wt. %) to less than about 100 wt. % based on the total weight of the polymer composition; alternatively greater than about 70 wt. % to less than about 100 wt. %; or alternatively greater than about 80 wt. % to less than about 100 wt. % with the remaining amount being substantially comprised of the HMW component. Herein, "the remaining amount being substantially comprised of the HMW component" is defined as that amount of polymer that is remaining once the LMW component is accounted for is comprised of greater than about 95, 96, 97, 98, 99, or 99.5 wt. % HMW component. For example, if the polymer comprises 80 wt. % LMW component, then greater than about 95% of the remaining 20 wt. % of the polymer is the HMW component.

In an embodiment, the LMW component has a weight average molecular weight ($M_w$) of greater than about 40 kg/mol; alternatively greater than about 50 kg/mol; alternatively greater than about 60 kg/mol; or alternatively from about 50 kg/mol to about 120 kg/mol while the HMW component has a $M_w$ of greater than about 800 kg/mol; alternatively greater than about 900 kg/mol; alternatively greater than about 1,000 kg/mol; or alternatively from about 800 kg/mol to about 2000 kg/mol. The weight average molecular weight describes the molecular weight distribution of a polymer composition and is calculated according to equation 1:

$$M_w = \frac{\sum_i N_i M_i^2}{\sum_i N_i M_i} \quad (1)$$

where $N_i$ is the number of molecules of molecular weight $M_i$.

In an embodiment, the polymer (comprising both the LMW component and HMW component) has a $M_w$ of from about 150 kg/mol to about 300 kg/mol, alternatively from about 160 kg/mol to about 300 kg/mol; or alternatively from about 170 kg/mol to about 300 kg/mol; and a z-average molecular weight ($M_z$) of about equal to or greater than 800 kg/mol; alternatively from about 800 kg/mol to about 2000 kg/mol; alternatively from about 900 kg/mol to about 2000 kg/mol; or alternatively from about 1000 kg/mol to about 2000 kg/mol. The z-average molecular weight is a higher order molecular weight average which is calculated according to equation (2)

$$M_z = \Sigma_i N_i M_i^3 / \Sigma_i N_i M_i^2 \quad (2)$$

where $N_i$ is the amount of substance of species i and $M_i$ is the molecular weight of species i.

The LMW component may be further characterized by a molecular weight distribution (MWD) of greater than about 3, alternatively greater than about 3.5, alternatively greater than about 4 while the HMW component may be further characterized by a MWD of less than about 4; alternatively less than about 3; alternatively less than about 2.5. The MWD is the ratio of the $M_w$ to the number average molecular weight ($M_n$), which is also referred to as the polydispersity index (PDI) or more simply as polydispersity. The number average molecular weight is the common average of the molecular weights of the individual polymers and may be calculated according to equation (3) where $N_i$ is the number of molecules of molecular weight $M_i$.

$$M_n = \frac{\sum_i N_i M_i}{\sum_i N_i} \quad (3)$$

The polymer (comprising both the LMW component and the HMW component) may have a PDI of greater than about 8, alternatively greater than about 9, or alternatively greater than about 10.

The LMW component may be further characterized by a ratio of $M_z/M_w$ of from about 3 to about 5, or alternatively from about 3 to about 4 while the HMW component may be further characterized by ratio of $M_z/M_w$ of less than about 3; alternatively less than about 2.8; alternatively less than about 2.5. The ratio of $M_z/M_w$ is another indication of the breadth of the MWD of a polymer. The polymer (comprising both the LMW component and the HMW component) may have a ratio of $M_z/M_w$ of greater than about 5, alternatively greater than about 6, or alternatively greater than about 7.

In an embodiment, a polymer of the type described herein is characterized by a density of from about 0.950 g/cc to about 0.965 g/cc, alternatively from about 0.955 g/cc to about 0.965 g/cc, or alternatively from about 0.955 g/cc to about 0.962 g/cc. For example, the polymer may be a polyethylene homopolymer or copolymer having a density of greater than about 0.950 g/cc, alternatively greater than about 0.955 g/cc, or alternatively greater than about 0.960 g/cc.

In an embodiment, a polymer of the type described herein has a melt index, MI, in the range of from about 0.01 g/10 min. to about 1 g/10 min., alternatively from about 0.1 g/10 min. to about 0.8 g/10 min., alternatively from about 0.2 g/10 min. to about 0.8 g/10 min.; or alternatively from about 0.2 g/10 min. to about 0.6 g/10 min. The melt index (MI) refers to the amount of a polymer which can be forced through an extrusion rheometer orifice of 0.0825 inch diameter when subjected to a force of 2160 grams in ten minutes at 190° C., as determined in accordance with ASTM D 1238.

In an embodiment, a polymer of the type disclosed herein has a shear response, or ratio of high-load melt index to melt index (HLMI/MI) in the range of from about 50 to about 500, alternatively from about 90 to about 300, or alternatively from about 100 to about 250. The HLMI represents the rate of flow of a molten polymer through an orifice of 0.0825 inch diameter when subjected to a force of 21,600 grams at 190° C. as determined in accordance with ASTM D 1238.

The polymers of this disclosure may be further characterized by their rheological breadth. Rheological breadth refers to the breadth of the transition region between Newtonian and power-law type shear rate for a polymer or the frequency dependence of the viscosity of the polymer. The rheological breadth is a function of the relaxation time distribution of a polymer which in turn is a function of the polymer molecular structure or architecture. Assuming the Cox-Merz rule, the rheological breadth may be calculated by fitting flow curves generated in linear-viscoelastic dynamic oscillatory frequency sweep experiments with a modified Carreau-Yasuda (CY) model, which is represented by the following equation:

$$|\eta^*(\omega)| = \eta_0 [1+(\tau_\eta \omega)^a]^{(n-1)/a}$$

where $|\eta^*(\omega)|$ is the magnitude of complex shear viscosity; $\eta_0$ is the zero-shear viscosity; $\tau_\eta$ is the viscous relaxation time; a is a breadth parameter; n is a parameter that fixes the final power law slope, which is fixed at 2/11 in this work; and $\omega$ is an angular frequency of oscillatory shear deformation.

To facilitate model fitting, the power law constant is held at a constant value. Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987), each of which is incorporated by reference herein in its entirety.

In an embodiment, the polymers of this disclosure have a ratio of "eta at 0.1" ($\eta_{0.1}$) to "eta at 100" ($\eta_{100}$), ($\eta_{0.1}/\eta_{100}$), of greater than about 20; alternatively greater than about 22, or alternatively greater than about 25. The ratio of $\eta_{0.1}/\eta_{100}$ is indicative of shear thinning behavior of a polymer.

In an embodiment, the polymers of this disclosure have an "CY-a" value of less than about 0.30, alternatively less than about 0.25, alternatively less than about 0.2 wherein the dynamic complex viscosity versus frequency scan are fitted to the Carreau-Yasuda equation with an n=0.1818 value.

In an embodiment, the polymers of this disclosure are further characterized by quadrant plot values where $\eta_{100}$ is less than about 1400 and $N_{100}$ is greater than about 0.3; alternatively $\eta_{100}$ is less than about 1400 and $N_{100}$ is greater than about 0.35; alternatively $\eta_{100}$ is less than about 1350 and $N_{100}$ is greater than about 0.35; or alternatively $\eta_{100}$ is less than about 1300 and $N_{100}$ is greater than about 0.35. The quadrant plot is indicative of the processability of a blow molding polymer with respect to process output where $\eta_{100}$ is shear viscosity at 100 shear rate and $N_{100}$ is the slope of the logG* vs. log $\omega$ curve at 100 shear rate where G* is complex modulus, and $\omega$ is shear rate.

In an embodiment, the polymers of this disclosure are further characterized by a crossover modulus (CM) of from about 1,000 Pascals (Pa) to about 160,000 Pa; alternatively from about 22,000 Pa to about 130,000 Pa; or alternatively from about 29,000 Pa to about 70,000 Pa and a predicted die swell of from about 25% to about 35%; alternatively from about 27% to about 33%; or alternatively from about 28% to about 30%. The die swell refers to the increase in diameter of a polymeric extrudate upon emerging an extrusion die. The crossover modulus is determined by graphing the storage modulus and loss modulus as a function of shear rate. The storage modulus in viscoelastic materials measures the stored energy and represents the elastic portion of the material. The loss modulus relates to the energy dissipated as heat and represents the viscous portion related to the amount of energy lost due to viscous flow. The intersection of the storage and loss modulus is termed the crossover modulus to which die swell is correlated. A correlation between the crossover modulus (CM) and die swell was noted and the two parameters measured during the blowing of a standard 110 g one-gallon dairy bottle. The correlation is as follows:

$$\text{Predicted Layflat(LF)}=5.452+0.234CM/10^5$$

$$\text{Measured die swell}=LF/(3.14*d/2)-1$$

where d is the diameter of the die and where the measured die swell is the length, or layflat, of the bottom flashing from the molded bottle divided by one half the circumference of the die minus 1.

A polymer of the type disclosed herein may be further characterized by the degree and nature of branching present in the individual components of the polymer composition and/or in the polymer composition as a whole. Short chain branching (SCB) is known for its effects on polymer properties such as stiffness, tensile properties, heat resistance, hardness, permeation resistance, shrinkage, creep resistance, transparency, stress crack resistance, flexibility, impact strength, and the solid state properties of semi-crystalline polymers such as polyethylene.

In an embodiment, the LMW component displays SCB at a peak molecular weight (SCB@$M_p$) of from about 0 to about 1 per 1000 total carbon atoms; alternatively from about 0 to about 0.7; or alternatively from about 0 to about 0.4. The SCB@$M_p$ herein is representative of the SCB content for the main body of the LMW component. Polymers of the type disclosed herein (comprising both the LMW component and the HMW component) may display low to undetectable amounts of SCB in the main body of the LMW component.

In an embodiment, the polymer (comprising both the LMW component and the HMW component) displays a ratio of SCB at a molecular weight (MW) of $10^6$ to SCB@Mp of equal to or greater than about 3; alternatively equal to or greater than about 4; or alternatively equal to or greater than about 5. The SCB at a MW of $10^6$ is indicative of the level of SCB in the HMW component and the ratio of SCB at a MW of $10^6$ to SCB@Mp is indicative of the effectiveness of placing SCB selectively at the higher molecular weight end of the polymer.

In an embodiment, the polymers disclosed herein display unique SCB distribution characteristics wherein the amount of SCB in the HMW component exceeds that found in the LMW component and within the HMW component generally the level of SCB remains constant or increases as a function of molecular weight. As will be appreciated by one of ordinary skill in the art, the SCB content as a function of molecular weight may be represented by a plurality of data points such that the dataset used to describe the SCB content over a range of molecular weight may be relatively large (i.e., greater than about 100 datapoints). It is contemplated that the unique SCB distribution characteristics of a polymer of the type disclosed herein are observable over the range of molecular weights encompassed by the HMW component notwithstanding any normal fluctuations in a particular subset of the data. In an embodiment, the polymers disclosed herein display a SCB distribution characterized by an average SCB content for each 10 wt. % fraction of polymer that increases with increase of the molecular weight of the polymer at molecular weights of greater than about 100 kg/mol.

The polymers disclosed herein may be formed into various articles, including, but not limited to, bottles, drums, toys, household containers, utensils, film products, drums, fuel tanks, pipes, geomembranes, and liners. Various processes may be used to form these articles, including, but not limited to, blow molding, extrusion molding, rotomolding, thermoforming, cast molding and the like. In an embodiment, the polymers of this disclosure are fabricated into an article by a shaping process such as blowmolding, extrusion blow molding, injection blow molding or stretch blow molding.

In an embodiment, a polymer of the type disclosed herein is formed into an article by extrusion blow molding (EBM). In EBM, a polymer is melted and extruded into a hollow tube (a parison). This parison is then captured by closing it into a cooled metal mold. Air is then blown into the parison, inflating it into the shape of the user desired article.

In an embodiment, a polymer of the type disclosed herein is formed into an article by injection blow molding (IBM). In IBM, a molten polymer composition is fed into a manifold where it is injected through nozzles into a hollow, heated preform mold. The preform mold forms the external shape and is clamped around a mandrel (the core rod) which forms the internal shape of the preform. The preform consists of a fully formed bottle/jar neck with a thick tube of polymer attached, which will form the body. The preform mold opens and the core rod is rotated and clamped into the hollow, chilled blow mold. The core rod opens and allows compressed air into the preform, which inflates it to the finished article shape.

In an embodiment, a polymer of the type disclosed herein is formed into an article by stretch blow molding (SBM). In SBM, the polymer is first molded into a "preform" using the injection molding process. These preforms are produced with the necks of the bottles, including threads (the "finish") on one end. These preforms are packaged, and fed later (after cooling) into a reheat stretch blow molding machine. In the SBM process, the preforms are heated above their glass transition temperature, then blown using high pressure air into articles using metal blow molds.

In an embodiment, the articles fabricated from polymers of this disclosure display enhanced mechanical properties such as an increased environmental stress crack resistance when compared to an article fabricated from a dissimilar polymer. Herein, dissimilar polymers refer to polymers having a similar density and monomer composition but prepared by using different methodology and/or different catalyst compositions. Environmental stress cracking refers to the premature initiation of cracking and embrittlement of a plastic due to the simultaneous action of stress, strain and contact with specific chemical environments. Environmental Stress Crack Resistance (ESCR) measures a polymer's resistance to this form of damage.

In an embodiment a polymer resin of the type disclosed herein may have a density of from about 0.950 g/ml to about 0.965 g/ml and relationship between short chain branching and molecular weight that is characterized by the equation $$dy/dx=g(x)$$

where dy is the change in the amount of short chain branching and dx is the change in the molecular weight wherein when dy is a nonnegative number and dx is greater than zero g(x) is a piecewise defined function such that g(x) depends on the molecular weight domain and wherein when formed into an article the resin has an environmental stress crack resistance (ESCR) of equal to or greater than about 100 hours. For example, g(x) within a first MW domain may be a nonnegative number; within a second MW domain g(x) may be greater than zero; and within a third MW domain g(x) may be a non-negative number or a monotonically increasing function wherein the MW increases from the first MW domain, through the second MW domain to the third MW domain.

In an embodiment, a polymer of this disclosure displays an ESCR value (Y) where $$Y \geq -75{,}078{,}088{,}945x^4 + 287{,}612{,}937{,}602x^3 - 413{,}152{,}026{,}579x^2 + 263{,}756{,}655{,}421x - 63{,}139{,}684{,}577$$

and where x is the density of the polymer and the ESCR is measured in accordance with ASTM D 1693 condition B, 100% Igepal, F50. Igepal refers to the surface active wetting solution in used the procedure described in ASTM D 1693 condition B.

In an embodiment, a polymer of the type disclosed herein having a density of from about 0.950 g/cc to less than about 0.955 g/cc and a MI of from about 0.2 g/10 min. to about 0.8 g/10 min. displays an ESCR of greater than about 1500 hours, alternatively greater than about 2000 hours, alternatively greater than about 2500 hours as determined in accordance with ASTM D1693 condition B, 100% Igepal, F50.

In an embodiment, a polymer of the type disclosed herein having a density of from about 0.955 g/cc to about 0.960 g/cc and a MI of from about 0.2 g/10 min. to about 0.8 g/10 min. displays an ESCR of greater than about 300 hours, alternatively greater than about 1000 hours, alternatively greater than about 1500 hours as determined in accordance with ASTM D1693 condition B, 100% Igepal, F50.

In an embodiment, a polymer of the type described herein having a density of from about 0.958 g/cc to about 0.962 g/cc and a MI of from about 0.2 g/10 min. to about 0.8 g/10 min. displays an ESCR of greater than about 100 hours, alternatively greater than about 300 hours, alternatively greater than about 700 hours as determined in accordance with ASTM D1693 condition B, 100% Igepal, F50.

In an embodiment, a polymer of the type disclosed herein having a density of from about 0.960 g/cc to about 0.965 g/cc and a melt index of from about 0.2 g/10 min. to about 0.6 g/10 min. when formed into an article displays an ESCR of equal to or greater than about 150 hours when measured in accordance with ASTM D 1693 condition B, 100% Igepal, F50.

In an embodiment, a polymer of the type disclosed herein having a density of from about 0.950 g/cc to about 0.955 g/cc and a melt index of from about 0.2 g/10 min. to about 0.6 g/10 min. when formed into an article displays an ESCR of equal to or greater than about 2000 hours when measured in accordance with ASTM D 1693 condition B, 100% Igepal, F50.

In an embodiment, a polymer of the type disclosed herein having a density of from about 0.955 g/cc to about 0.960 g/cc and a melt index of from about 0.2 g/10 min. to about 0.6 g/10 min. when formed into an article displays an ESCR of equal to or greater than about 500 hours when measured in accordance with ASTM D 1693 condition B, 100% Igepal, F50.

In an embodiment, a polymer of the type disclosed herein having a density of from about 0.950 g/cc to about 0.965 g/cc and a melt index of from about 0.2 g/10 min. to about 0.6 g/10 min. when formed into an article displays an ESCR (Y) wherein $Y \geq -75{,}078{,}088{,}945x^4 + 287{,}612{,}937{,}602x^3 - 413{,}152{,}026{,}579x^2 + 263{,}756{,}655{,}421x - 63{,}139{,}684{,}577$ and wherein x is the density of the polymer.

In an embodiment, a polymer of the type disclosed herein having at least one lower LMW component and at least one HMW component and comprising a copolymer of ethylene and a comonomer comprising 1-hexene, 1-heptene, 1-octene, 1-nonene, 1-decene, or combinations thereof; and comprising equal to or less than about 0.5 mol. % comonomer; and having the lower molecular weight component present in an amount of greater than about 60 wt. % and less than about 100 wt. %; and having a $M_w$ of the LMW component ranging from about 50 kg/mol to about 120 kg/mol and the $M_w$ of the HMW component ranging from about 800 kg/mol to about 2000 kg/mol and having a polydispersity index of the HMW component of from about 2 to about 4; and having the ratio of SCB@ MW of $1 \times 10^6$ to SCB@ Mp of greater than 3 and having a SCB content of each 10 wt. % fraction of polymer increasing with molecular weight increase in a range of MW of greater than 100 kg/mol when formed into an article displays an ESCR of greater than about 2000 hours. Alternatively, the ESCR is greater than about 500 hours when the comonomer is present in an amount of less than about 0.3 mol. %; alternatively the ESCR is greater than about 150 hours when the comonomer is less than about 0.2 mol.%.

EXAMPLES

The subject matter having been generally described, the following examples are given as particular embodiments of the disclosure and to demonstrate the practice and advantages thereof. It is understood that the examples are given by way of illustration and are not intended to limit the specification of the claims to follow in any manner. The following testing procedures were used to evaluate the various polymers and compositions.

High load melt index (HLMI, g/10 min) was determined in accordance with ASTM D 1238 condition E at 190° C. with a 21,600 gram weight.

Polymer density was determined in grams per cubic centimeter (g/cc) on a compression molded sample, cooled at about 15° C. per hour, and conditioned for about 40 hours at room temperature in accordance with ASTM D 1505 and ASTM D 1928, procedure C.

Molecular weight and molecular weight distributions were obtained using a PL-GPC 220 (Polymer Labs, an Agilent Company) system equipped with a IR4 detector (Polymer Char, Spain) and three Styragel HMW-6E GPC columns (Waters, MA) running at 145° C. The flow rate of the mobile phase 1,2,4-trichlorobenzene (TCB) that contains 0.5 g/L 2,6-di-t-butyl-4-methylphenol (BHT) was set at 1 mL/min and the concentration of polymer solutions was generally kept in the range of 1.0-1.5 mg/mL, depending on the molecular weight. Sample preparation was conducted at 150° C. for nominally 4 h with occasional and gentle agitation before the solutions being transferred to sample vials for injection. The integral calibration method was used to deduce molecular weights and molecular weight distributions using a Chevron Phillips Chemical Company's HDPE polyethylene resin, MARLEX BHB5003, as the broad standard. The integral table of the broad standard was pre-determined in a separate experiment with SEC-MALS.

Short-chain branching (SCB) and SCB distribution across the molecular weight distribution (SCBD) were determined via an IR5-detected GPC system (IR5-GPC), wherein the GPC system used was a PL220 GPC/SEC system (Polymer Labs, an Agilent company) equipped with three Styragel HMW-6E columns (Waters, MA) for polymer separation. To the GPC columns was connected a thermoelectric-cooled IR5 MCT detector (IR5) (Polymer Char, Spain) via a hot-transfer line. Chromatographic data are obtained from two output ports of the IR5 detector. First, the analog signal goes from the analog output port to a digitizer before connecting to Computer "A" for molecular weight determinations via the Cirrus software (Polymer Labs, an Agilent Company) and the integral calibration method using a broad MWD HDPE Marlex™ BHB5003 resin (Chevron Phillips Chemical Company) as the broad MW standard. The digital signals, on the other hand, go via a USB cable directly to Computer "B" where they are collected by a LabView data collection software provided by Polymer Char. Chromatographic conditions are set as the following: column oven temperature: 145° C.; flowrate: 1 mL/min; injection volume: 0.4 mL; polymer concentration: nominally at 2.0 mg/mL, depending on sample molecular weight. The temperatures for both the hot-transfer line and IR5 detector sample cell are set at 150° C. while the temperature of the electronics of the IR5 detector is set at 60° C.

Short-chain branching content was deduced via an in-house method using the intensity ratio of $CH_3$ ($I_{CH3}$) to $CH_2$ ($I_{CH2}$) coupled with a calibration curve. The calibration curve is a plot of SCB content ($\chi_{SCB}$) as a function of the intensity ratio of $I_{CH3}/I_{CH2}$. To obtain a calibration curve, a group of polyethylene resin (no less than 5) of SCB level ranging from zero to ca. 32 SCB/1,000 total carbons (SCB Standards) are used. All these SCB Standards have known SCB levels and flat SCB distribution profiles pre-determined separately by NMR and the solvent-gradient fractionation coupled with NMR (SGF-NMR) methods. Using SCB calibration curves thus established, profiles of short-chain branching distribution across the molecular weight distribution (SCBD) can be obtained for resin fractionated by the IR5-GPC system under exactly the same chromatographic conditions as for these SCB standards. A relationship between the intensity ratio and the elution volume can be converted into SCB distribution as a function of MWD using a predetermined SCB calibration curve (i.e. intensity ratio of $I_{CH3}/I_{CH2}$ vs. SCB content) and MW calibration curve (i.e. molecular weight vs. elution time) to convert the intensity ratio of $I_{CH3}/I_{CH2}$ into SCB content and the molecular weight, respectively.

Rheology measurements were made as follows:
Samples for melt viscosity measurement were compression molded at 182° C. for a total of three minutes. The samples were allowed to melt at a relatively low pressure for one minute and then subjected to a high molding pressure for additional two minutes. The molded samples were then quenched in a cold (room temperature) press. 2 mm×25.4 mm diameter disks were stamped out of the molded slabs for rheological characterization. The fluff samples were stabilized with 0.1 wt. % BHT dispersed in acetone and vacuum dried before molding.
Small-strain oscillatory shear measurements were performed on an ARES rheometer (Rheometrics Inc., now TA Instruments) or Anton Paar rheometers (Anton Paar GmbH) using parallel-plate geometry. The test chamber of the rheometer was blanketed in nitrogen in order to minimize polymer degradation. Upon sample loading and after oven thermal equilibration, the specimens were squeezed between the plates to a 1.6 mm thickness and the excess was trimmed. The dynamic shear viscosities were measured over an angular frequency range of 0.03-100 rad/s.

These data were fit to the Carreau-Yasuda (C-Y) equation to determine zero-shear viscosity ($\eta_0$) and other rheological parameters such as relaxation times ($\tau_n$), and a measure of the breadth of the relaxation of the relaxation time distribution (CY-a). See R. Byron Bird, Robert C. Armstrong, and Ole Hassager, Dynamics of Polymeric Liquids, Volume 1, Fluid Mechanics, (John Wiley & Sons, New York, 1987.

The intersection of the storage modulus and the loss modulus, both varied as a function of shear rate, is called the crossover modulus, and it is measured in Pascals. It was used to calculate the predicted die swell. A correlation was noted between the crossover modulus and the die swell measured during the blowing of a standard 110 g 1-gallon dairy bottle. The correlation is as follows:

Predicted Layflat(LF)=5.452+0.234CM/$10^5$, where CM=crossover modulus.

Predicted die swell=LF/(3.14*2.75/2)−1, where LF is predicted Layflat.

The measured die swell is the length, or layflat (LF), of the bottom flashing from the molded bottle divided by one half the circumference of the die minus 1. That is: Measured die swell=LF/(3.14*d/2)−1, where d is the diameter of the die.

Example 1

Polymers of the type described herein were prepared using a catalyst system comprising at least two metallocene complexes, e.g. MTE1/MTE2, a solid activator support (e.g. fluorided silica coated alumina), and a trialkylaluminum (e.g. triisobutylaluminum). The structures of MTE-1 and MTE-2 are shown in FIG. 1. The catalyst system was used to polymerize ethylene and 1-hexene in the presence of hydrogen in a hydrocarbon diluent (e.g. isobutane). Three samples of polymers of the type described herein were prepared and designated Samples 1-3. The MI, HLMI, density, and ESCR of these samples are presented in Table 1. Also shown are the values for a comparative polyethylene resin MARLEX HHM 5502BN which is a high density polyethylene commercially available from Chevron Phillips Chemical Company LLC.

TABLE 1

| Sample | MI (dg/min) | HLMI(dg/min) | Density (g/cc) | ESCR (hours) (Condition B, 100% lge pal, $F_{50}$) |
|---|---|---|---|---|
| 1 | 0.22 | 41.3 | 0.9551 | >2000 |
| 2 | 0.56 | 60.9 | 0.9592 | 580 |
| 3 | 0.47 | 54.4 | 0.957 | >2000 |
| Comparative | 0.35 | NA | 0.955 | 35 |

Figure 2:
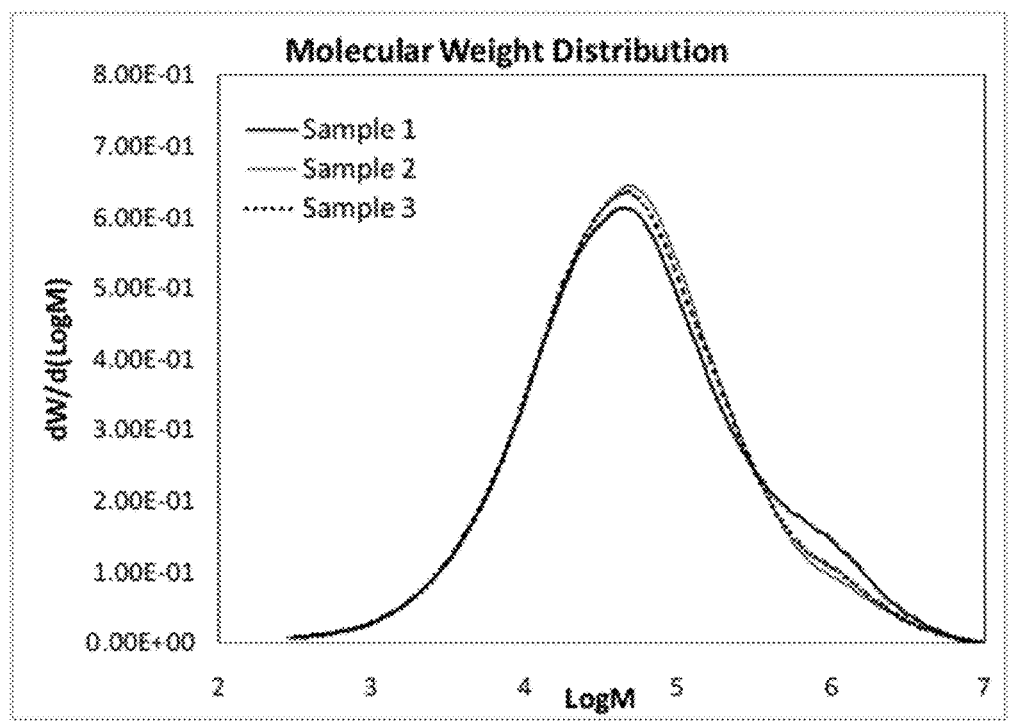
FIG. 2 is a graphical representation of molecular weight distribution profiles for the samples from Example 1.
Figure 3:
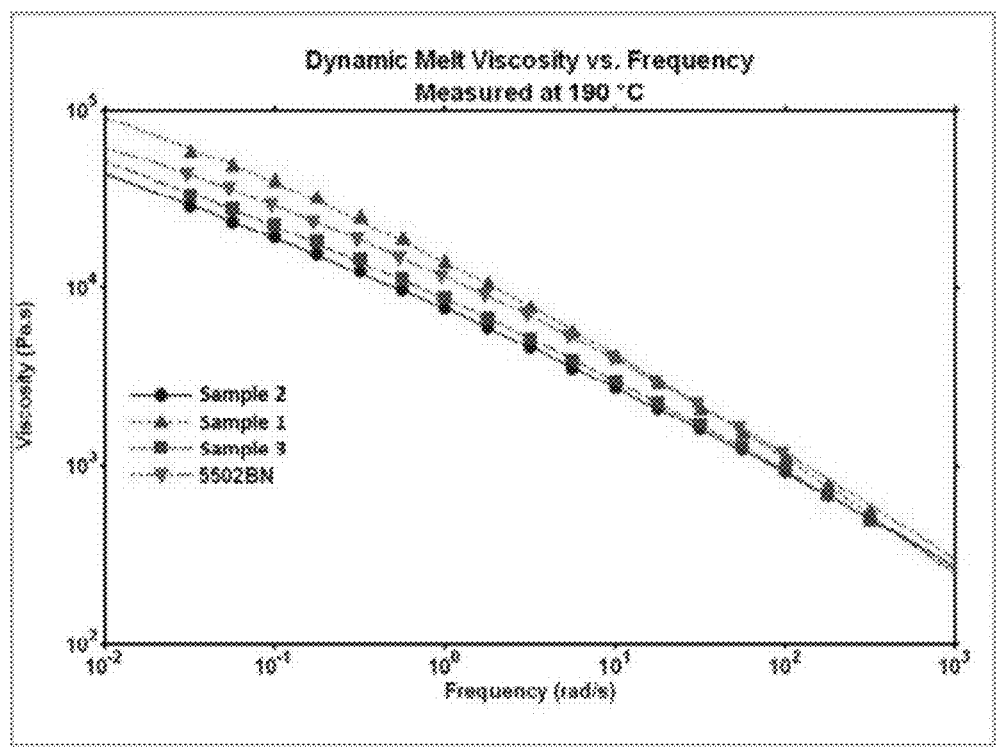
FIG. 3 is a plot of the dynamic melt viscosity as a function of frequency for the samples from Example 1.
Figure 4:
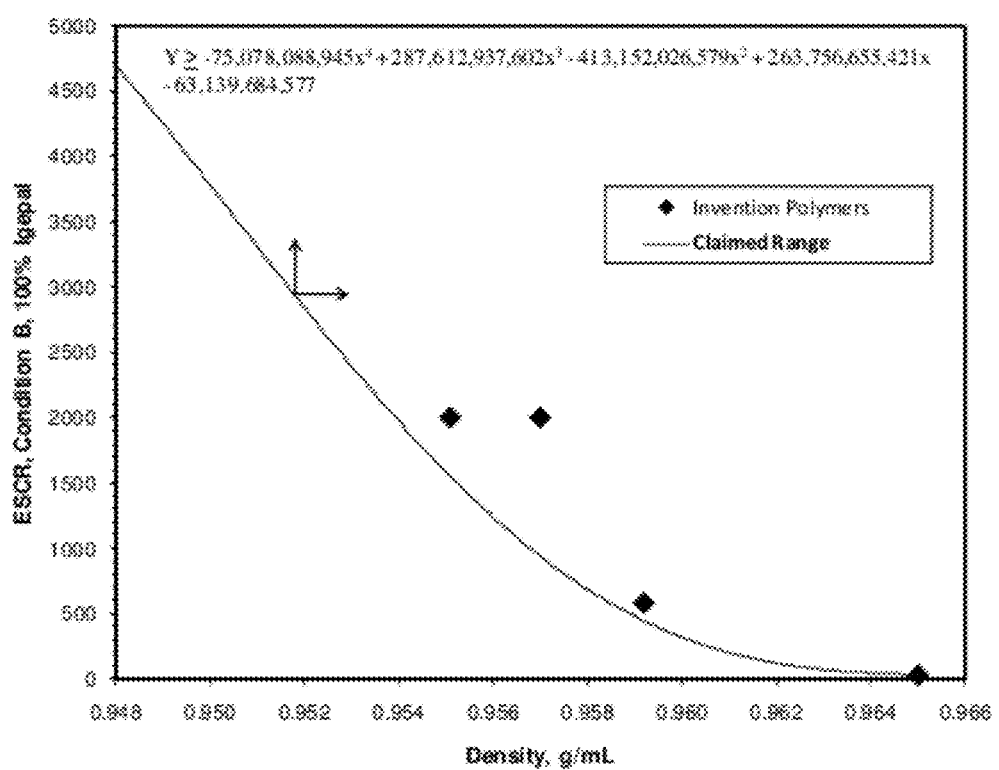
FIG. 4 is a plot of environmental stress crack resistance as a function of density for the samples from Example 1.

The molecular weight distribution and dynamic melt viscosity as a function of frequency for Samples 1-3 and the comparative sample are shown in FIGS. 2 and 3 respectively. FIG. 4 is a plot of the ESCR as a function of polymer density for Samples 1-3.

Example 2

Figure 5:
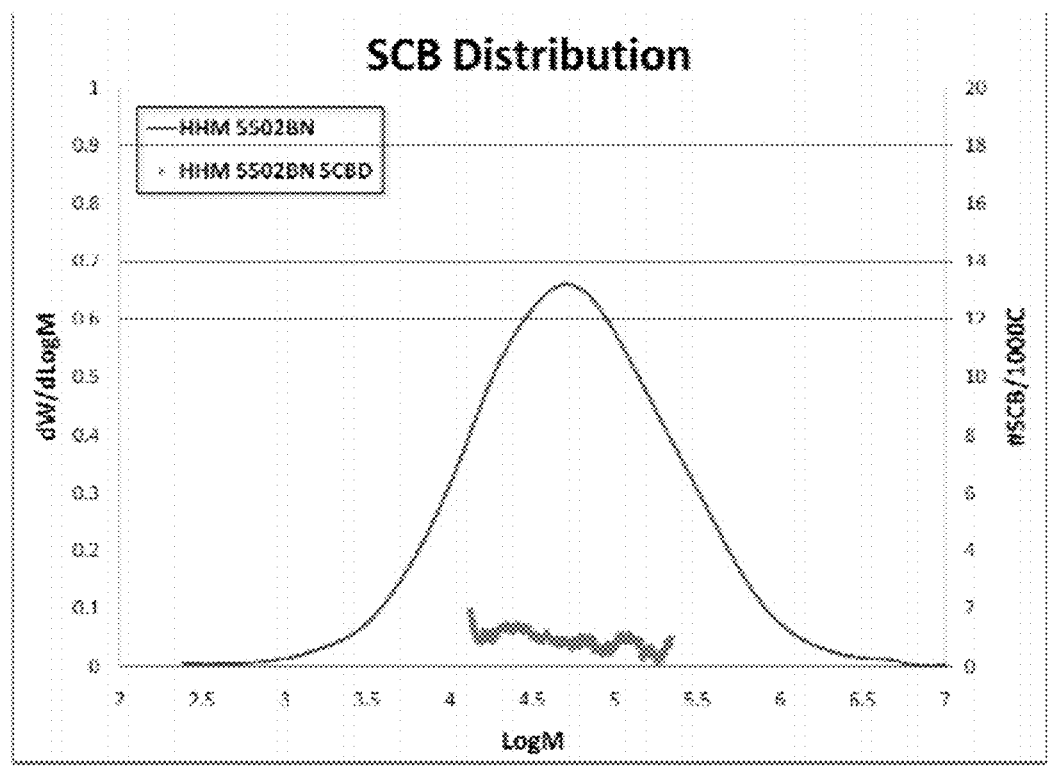
FIGS. 5-7 are plots of the short chain branching (SCB) distribution of the samples from Example 1.
Figure 6:
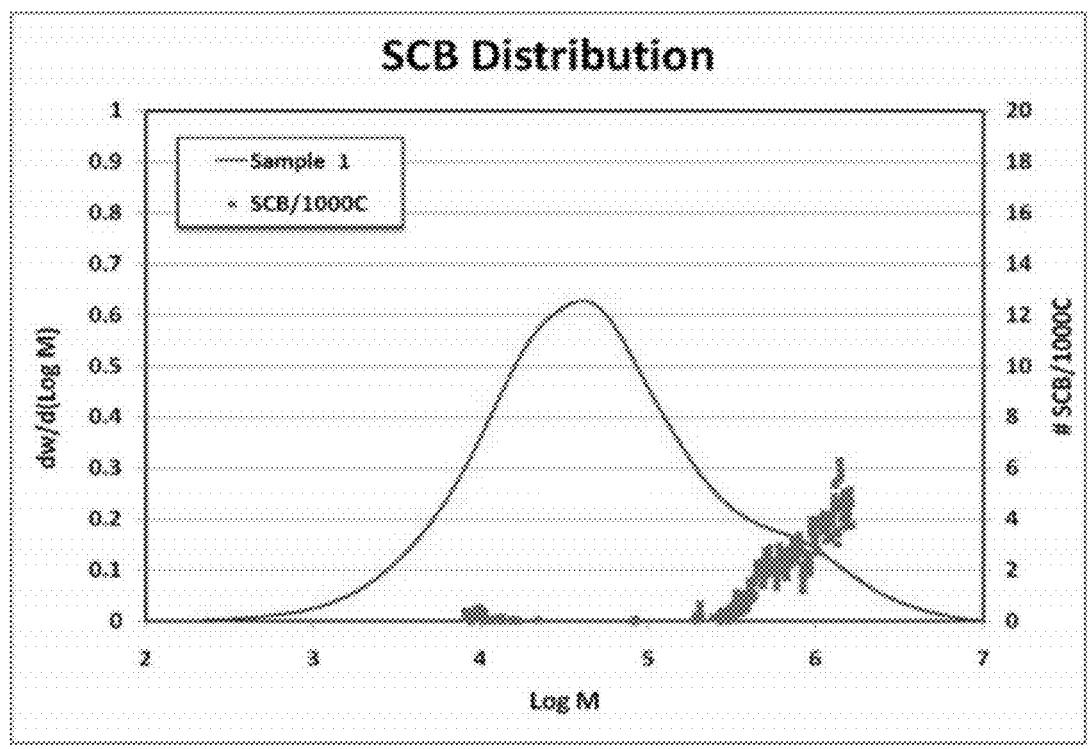
Figure 7:
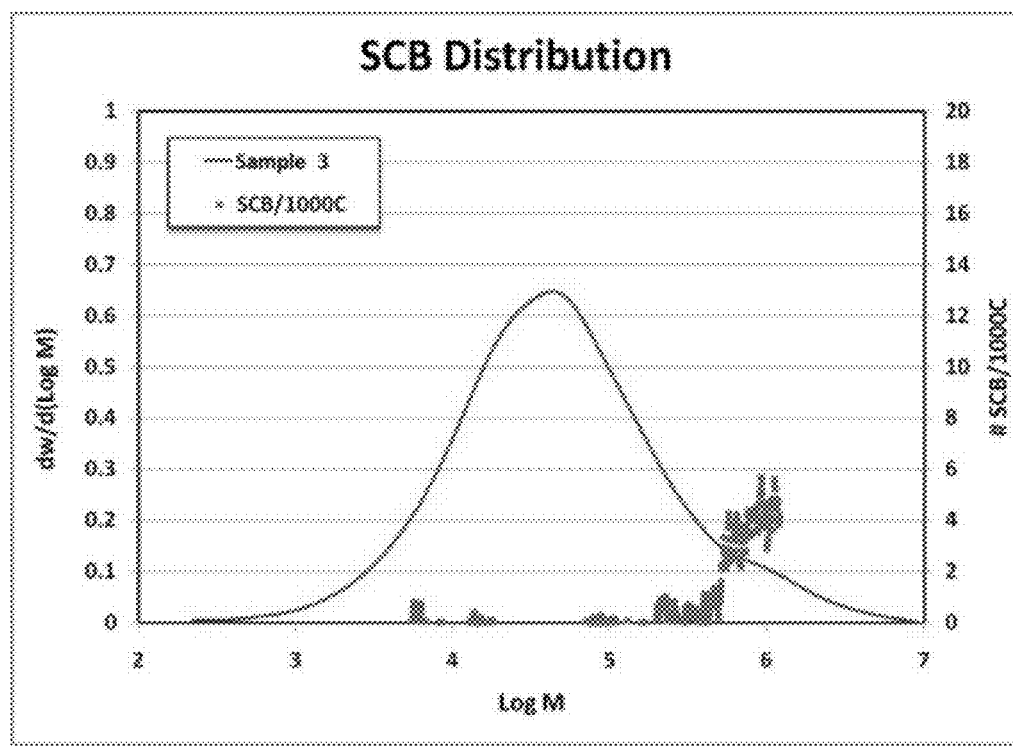

SCB and SCBD measurements were made for Samples 1 and 3 of Example 1 and the comparative polymer. The SCBD profile is presented in FIGS. 5, 6, and 7 for the comparative polymer, Sample 1, and Sample 3 respectively. The results demonstrate that short chain branching in Samples 1 and 3 is mainly located at the higher molecular weight end.

Figure 8:
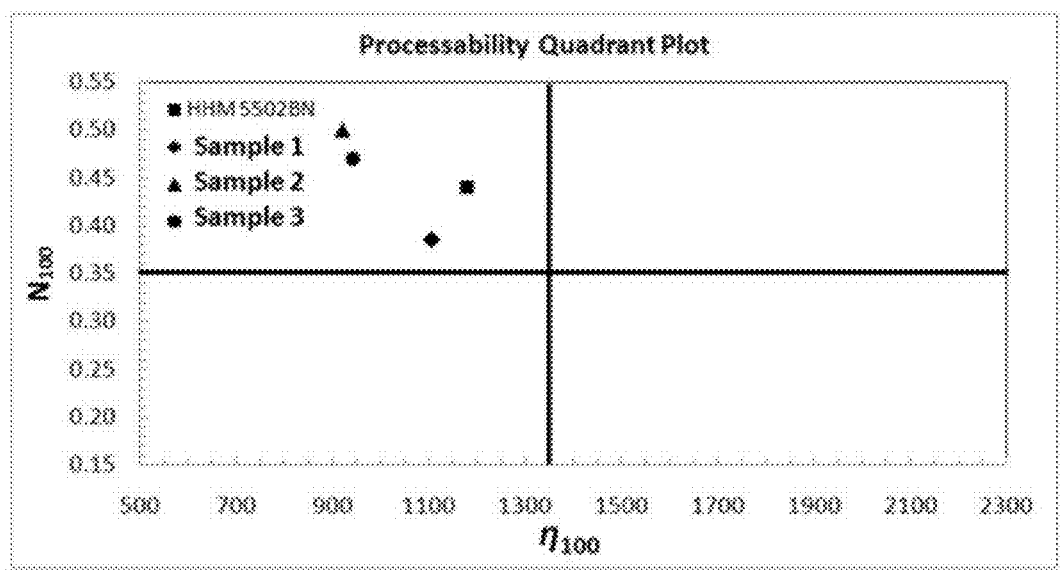
FIG. 8 is a quadrant plot for the samples from Example 1.

The processability of the polymers was also investigated by preparing a quadrant plot of the samples from Example 1. The quadrant plot shown in FIG. 8 demonstrates the processability of blow molding resins with respect to process output.

While embodiments of the invention have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference, to the extent that they provide exemplary, procedural or other details supplementary to those set forth herein.

What is claimed is:

1. A polymer having a density of from about 0.960 g/cc to about 0.965 g/cc, a melt index of from about 0.2 g/10 min. to about 0.6 g/10 min., and a high load melt index from greater than about 40 dg/min to about 500 dg/min., wherein an article formed from the polymer has an environmental stress crack resistance of equal to or greater than about 150 hours when measured in accordance with ASTM D 1693 condition B, 100% Igepal.

2. The polymer of claim 1 having an eta100 ($\eta_{100}$) of less than about 1350 and a slope of the curve of a plot of the log of the complex modulus as a function of the log of shear rate at 100 shear rate ($N_{100}$) of greater than about 0.35.

3. The polymer of claim 1 having a predicted die swell of from about 25% to about 35%.

4. The polymer of claim 1 having a z-average molecular weight ($M_z$) of greater than about 800 kg/mol and a ratio of z-average molecular weight to weight average molecular weight ($M_z/M_w$) of greater than about 5.

5. The polymer of claim 1, wherein the polymer comprises a copolymer of ethylene and a comonomer comprising 1-hexene, 1-heptene, 1-octene, 1-nonene, 1-decene, or combinations thereof.

6. A polymer having a density of from about 0.955 g/cc to about 0.960 g/cc, a melt index of from about 0.2 g/10 min. to about 0.6 g/10 min., and a high load melt index from greater than about 40 dg/min to about 500 dg/min., wherein an article formed from the polymer has an environmental stress crack resistance of equal to or greater than about 500 hours when measured in accordance with ASTM D 1693 condition B, 100% Igepal.

7. The polymer of claim 6 having an $\eta_{100}$ of less than about 1350 and an $N_{100}$ of greater than about 0.35.

8. The polymer of claim 6 having a predicted die swell of from about 25% to about 35%.

9. The polymer of claim 6 having a $M_z$ of greater than 800 kg/mol and a $M_z/M_w$ of greater than about 5.

10. A polymer having a density of from about 0.950 g/cc to about 0.955 g/cc, a melt index of from about 0.2 g/10 min. to about 0.6 g/10 min., and a high load melt index from greater than about 40 dg/min to about 500 d min., wherein an article formed from the polymer has an environmental stress crack resistance of equal to or greater than about 2000 hours when measured in accordance with ASTM D 1693 condition B, 100% Igepal.

11. The polymer of claim 10 having an $\eta_{100}$ of less than about 1350 and an $N_{100}$ of greater than about 0.35.

12. The polymer of claim 10 having a predicted die swell of from about 25% to about 35%.

13. The polymer of claim 10 having a $M_z$ of greater than 800 kg/mol and a $M_z/M_w$ of greater than about 5.

14. A polymer having a density of from about 0.950 g/cc to about 0.965 g/cc, a melt index of from about 0.2 g/10 min. to about 0.6 g/10 min., and a high load melt index from greater than about 40 dg/min to about 500 dg/min., wherein an article formed from the polymer has an environmental stress crack resistance (Y) wherein $Y \geq -75{,}078{,}088{,}945 x^4 + 287{,}612{,}937{,}602 x^3 - 413{,}152{,}026{,}579 x^2 + 263{,}756{,}655{,}421 x - 63{,}139{,}684{,}577$ and wherein x is the density of the polymer.

15. The polymer of claim 14 having an $\eta_{100}$ of less than about 1350 and an $N_{100}$ of greater than about 0.35.

16. The polymer of claim 14 having a predicted die swell of from about 25% to about 35%.

17. The polymer of claim 14 having a $M_z$ of greater than 800 kg/mol and a $M_z/M_w$ of greater than about 5.

18. The polymer of claim 1 having a lower molecular weight (LMW) component and a higher molecular weight (HMW) component.

19. The polymer of claim 6 having a lower molecular weight (LMW) component and a higher molecular weight (HMW) component.

20. The polymer of claim 1 having a CY-a value of less than about 0.3.

21. The polymer of claim 6 having a CY-a value of less than about 0.3.

22. The polymer of claim 1 having a ratio of short chain branching at a molecular weight of $10^6$ to short chain branching in the main body of the LMW component of greater than about 3.

23. The polymer of claim 6 having a ratio of short chain branching at a molecular weight of $10^6$ to short chain branching in the main body of the LMW component of greater than about 3.

24. The polymer of claim 1 having an average short chain branching content of each 10 wt. % fraction of polymer increase with a molecular weight (MW) increase in a range of MW of greater than about 100 kg/mol.

* * * * *